(12) United States Patent
Brück

(10) Patent No.: US 7,927,401 B2
(45) Date of Patent: Apr. 19, 2011

(54) METHOD AND DEVICE FOR REDUCING THE NUMBER OF PARTICLES IN THE EXHAUST GAS OF AN INTERNAL COMBUSTION ENGINE

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 167 days.

(21) Appl. No.: 12/172,561

(22) Filed: Jul. 14, 2008

(65) Prior Publication Data
US 2009/0007544 A1 Jan. 8, 2009

Related U.S. Application Data

(63) Continuation of application No. PCT/EP2007/000232, filed on Jan. 12, 2007.

(30) Foreign Application Priority Data

Jan. 13, 2006 (DE) .......................... 10 2006 001 831

(51) Int. Cl.
*B03C 3/66* (2006.01)
(52) U.S. Cl. ............. 95/79; 95/80; 95/81; 96/69; 96/77; 96/80
(58) Field of Classification Search ................. 96/65–67, 96/69, 75, 77, 80; 95/78–81; 422/177, 180, 422/211
See application file for complete search history.

(56) References Cited

U.S. PATENT DOCUMENTS

| 4,205,969 A | 6/1980 | Matsumoto |
| 5,492,677 A | 2/1996 | Yoshikawa |
| 5,557,923 A | 9/1996 | Bolt et al. |
| 5,695,549 A | 12/1997 | Feldman et al. |
| 5,961,693 A * | 10/1999 | Altman et al. ................... 95/78 |
| 6,036,840 A | 3/2000 | Christensen |

(Continued)

FOREIGN PATENT DOCUMENTS

DE 4223277 A1 1/1994
(Continued)

OTHER PUBLICATIONS

International Search Report, dated Jun. 29, 2007.

*Primary Examiner* — Richard L Chiesa
(74) *Attorney, Agent, or Firm* — Laurence A. Greenberg; Werner H. Stemer; Ralph E. Locher

(57) ABSTRACT

A device for reducing the number of particles in the exhaust gas of an internal combustion engine includes at least two structures through which an exhaust gas can flow, initially through a first structure and then through a second structure during operation. An electrical potential difference can be generated between the structures. In this way, the exhaust gas downstream of the second structure has fewer particles, averaged over time, than the exhaust gas upstream of the first structure. In addition, the particles downstream of the second structure have a larger mean diameter than those upstream of the first structure, so that it is possible to reduce emissions, in particular of fine dust, in the exhaust gas of internal combustion engines. A method for reducing the number of particles in the exhaust gas of an internal combustion engine, is also provided.

9 Claims, 2 Drawing Sheets

U.S. PATENT DOCUMENTS

| | | |
|---|---|---|
| 7,267,805 B2 | 9/2007 | Brück et al. |
| 2003/0086837 A1 | 5/2003 | Brück et al. |
| 2003/0180198 A1 * | 9/2003 | Bruck et al. ................. 422/179 |
| 2005/0217258 A1 | 10/2005 | Bruck et al. |
| 2006/0272504 A1 * | 12/2006 | Nutsos ............................. 96/69 |

FOREIGN PATENT DOCUMENTS

| | | |
|---|---|---|
| EP | 0627263 A1 | 12/1994 |
| JP | 2001020721 A | 1/2001 |
| WO | 0192692 A1 | 12/2001 |

* cited by examiner

METHOD AND DEVICE FOR REDUCING THE NUMBER OF PARTICLES IN THE EXHAUST GAS OF AN INTERNAL COMBUSTION ENGINE

CROSS-REFERENCE TO RELATED APPLICATION

This application is a continuation under 35 U.S.C. §120, of copending International Application No. PCT/EP2007/000232, filed Jan. 12, 2007, which designated the United States; this application also claims the priority, under 35 U.S.C. §119, of German Patent Application DE 10 2006 001 831.1, filed Jan. 13, 2006; the prior applications are herewith incorporated by reference in their entirety.

BACKGROUND OF THE INVENTION

Field of the Invention

The present invention relates to a method and a device for reducing the number of particles in the exhaust gas of an internal combustion engine.

Internal combustion engines which are operated with hydrocarbons as the fuel emit an exhaust gas which also contains, inter alia, carbon-containing particles. The carbon-containing particles have various sizes, the distribution of which is variable. In particular, carbon-containing particles with small diameters, which are also referred to as fine dust, are supposed to be responsible for human and animal illnesses. Fine dust is understood in this case as meaning, in particular, particles, having a mean diameter which is 100 nanometers or less. Carbon-containing particles, in particular, also include carbon particles possibly containing adsorbed hydrocarbons.

In order to reduce the particle emissions, in particular in motor vehicles, use is often made of "closed particle filters", in which exhaust gas flows through a structure that has, in an alternating manner, closed channels and porous walls between the channels. In order to ensure as low a backpressure of the particle filter as possible, even in the already loaded state, use has to be made of porosities which allow the fine dust to pass through them in a substantially unfiltered form, so that closed particle filters of that type allow precisely those particles to pass through which, according to current thought, are supposed to pose a particularly high risk to human health.

SUMMARY OF THE INVENTION

It is accordingly an object of the invention to provide a method and a device for reducing the number of particles in the exhaust gas of an internal combustion engine, which overcome or at least mitigate the hereinafore-mentioned disadvantages of the heretofore-known methods and devices of this general type.

With the foregoing and other objects in view there is provided, in accordance with the invention, a device for reducing the number of particles in the exhaust gas of an internal combustion engine. The device comprises at least a first structure and a second structure. The structures are configured for conducting an exhaust gas flow initially through the first structure and then through the second structure during operation. The structures are configured for having an electric potential difference generated therebetween.

A structure is understood in this case as meaning a component which contains at least one cavity through which the exhaust gas can flow. Examples of structures of this type are honeycomb bodies, wire mesh structures, metal foam structures and the like. The electric potential difference can be generated, in particular, by one of the structures, preferably the second structure, being electrically conductively connected to ground while a voltage, preferably a negative voltage in comparison to the ground, is applied to the first structure. An electric insulation between at least one of the structures and other components of the exhaust gas system, in particular between one of the structures and at least one other structure, is particularly preferably provided. Preferably, a potential difference which does not lead to the formation of a plasma can be generated in this case.

The device according to the invention permits the agglomeration of particles during operation in such a way that the mean diameter of the particles is increased and at the same time the number of particles in the exhaust gas is reduced. This is based on an electrostatic agglomeration in which electrical charge is transmitted to the particles. The transfer of charge can take place, for example, through nitrogen ions, whereupon the particles have a negative charge. This at the same time promotes a depositing of the particles on the structure which acts as a positively charged electrode and is appropriately charged, and the agglomeration of a plurality of particles there. This increases the mean particle diameter. Even if, after the particles are deposited on the second structure, the then enlarged particle is detached from the structure, the enlarged particle is generally not split up. This results in firstly, during operation, the number of particles in the exhaust gas being reduced by the device according to the invention and in, secondly, the distribution function of the particle size being shifted toward larger particles in such a way that, in particular, the emission of fine dust would be substantially reduced by the device according to the invention.

In accordance with another feature of the invention, at least one structure includes a plurality of cavities through which a fluid can flow.

These can be regular cavities, such as, for example, channels, and/or irregular cavities which are formed, for example, by metal foam or wire mesh structures.

In accordance with a further feature of the invention, at least one structure includes a honeycomb structure.

This can preferably involve at least partially metallic honeycomb structures. In particular, at least one structure can advantageously be formed by coiling up or intertwining at least one metallic layer. In an advantageous manner, a fluid can flow through at least part of at least one subregion of at least one layer. Furthermore, the formation of a ceramic honeycomb structure with embedded electrodes is also possible and according to the invention.

In accordance with an added feature of the invention, at least one of the structures at least partially has a catalytically active coating.

A customary coating of a three-way catalyst can be provided in this case. In principle, a coating which catalyzes the conversion of the particles, i.e. in particular the at least partial oxidation of the particles, is preferred in such a way that the regeneration temperature, in particular of the second structure, can thus be advantageously reduced.

In accordance with an additional feature of the invention, the device has a through-flow direction and the first structure has a first length and the second structure has a second length in the through-flow direction, with the ratio of the first length to the second length being smaller than one.

In accordance with yet another feature of the invention, in order to achieve as good a deposition rate as possible, it has proven advantageous if the second structure is longer than the first structure. In particular, the length of the second structure is selected in such a manner that a predeterminable portion of the particles is deflected to the walls of the structure by the electrostatic forces generated by the second structure during operation. As an alternative to a ratio of the first length to the second length of less than one, the ratio can also be selected to be greater than one with, in an advantageous manner, an exhaust pipe section adjoining the second structure then being brought to the same electric potential as the second structure in such a way that that section of exhaust pipe can likewise serve for the deposition of particles, in particular in the case of large exhaust gas flows.

In accordance with yet a further feature of the invention, the first structure has a first length in the through-flow direction, with a spacing being formed in the through-flow direction between the first structure and the second structure, and with the ratio between the first length and the spacing being greater than approximately two, preferably greater than approximately four and particularly preferably approximately seven or more.

In principle, in the case of the device according to the invention, the spacing can be selected to be of such a small size that there is no short-circuit at all between the first and the second structures.

With the objects of the invention in view, there is also provided a method for reducing the number of particles in the exhaust gas of an internal combustion engine. The method comprises conducting the exhaust gas initially through a first structure and then through a second structure, and establishing an electric potential difference between the first structure and the second structure.

The method according to the invention can be carried out, in particular, in a device according to the invention.

In accordance with another mode of the invention, the potential difference is substantially constant over time.

A potential difference which is substantially constant over time can be ensured in a simple manner. Substantially constant is understood in this case as meaning a potential difference having fluctuations which lie in a range of 95% to 105% of the average value of the potential difference.

In accordance with a further mode of the invention, the potential difference varies over time.

A variation over time of the potential difference, in which the potential difference does not have any change of sign, i.e. in which the potential of the second structure is always higher than that of the first structure, is particularly preferred in this case. Periodic variations in the potential difference, particularly preferably low-frequency variations in the potential difference, in particular at frequencies of 10 Hz and less, preferably even of 5 Hz and less, are preferred in this case. Through the use of a variation over time of the potential difference, the second structure can particularly advantageously be acted upon uniformly and in a controllable manner by particles.

In accordance with an added mode of the invention, the potential difference is greater than 5 kilovolts (kV).

In particular, the potential difference can also be more than 10 kV or even 30 kV and more. This permits an efficient transfer of charge to the particles.

In accordance with a concomitant mode of the invention, the potential difference between the first structure and the second structure is positive.

That is to say that the second structure preferably has a higher electric potential than the first structure in such a way that the particles, when they flow through the first structure, are negatively ionized and are then deposited and agglomerated on the second structure.

The advantages and details disclosed for the method according to the invention can be applied and transferred in the same manner to the device according to the invention. The advantages and details disclosed for the device according to the invention can be applied and transferred in the same manner to the method according to the invention.

Other features which are considered as characteristic for the invention are set forth in the appended claims.

Although the invention is illustrated and described herein as embodied in a method and a device for reducing the number of particles in the exhaust gas of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
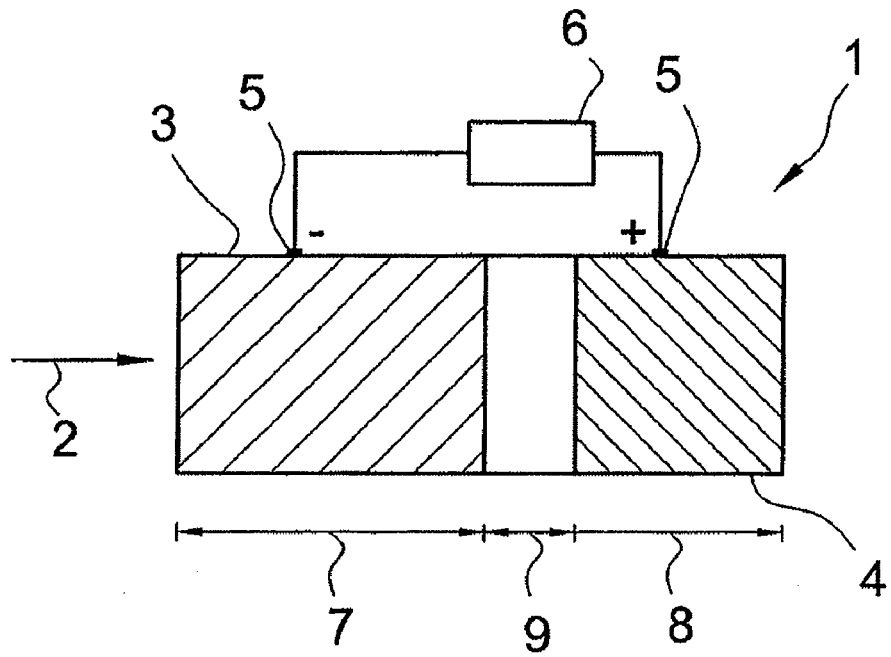
FIG. 1 is a diagrammatic, longitudinal-sectional view of an exemplary embodiment of the present invention.

Referring now to the figures of the drawings in detail and first, particularly, to FIG. 1 thereof, there is seen a diagrammatic illustration of a device 1 according to the invention for reducing the number of particles in the exhaust gas of a non-illustrated internal combustion engine. During operation, exhaust gas flows through the device in a through-flow direction 2. During operation of the device 1, the exhaust gas flows initially through a first structure 3 and then through a second structure 4. An electric potential difference can be generated between the structures 3, 4. The structures 3, 4 each have a respective electric terminal 5 through which the structures 3, 4 can be brought to defined electric potentials. In the present exemplary embodiment, the first structure 3 is at a negative potential and the second structure 4 is at a positive electric potential. This is achieved by connecting the terminals 5 to a corresponding D.C. voltage source 6.

If the exhaust gas loaded with particles flows through the first structure 3, a charge is transmitted to the carbon-containing particles in such a way that the latter have negative charges. When the flow passes through the second structure 4, the particles are then deposited on the second structure 4, with the particles adhering to one another and being joined to one another and therefore agglomerating. The agglomerated particles can then be converted later on, on the second structure 4, or can be detached from the second structure 4 through the use of gas pulses. In this way, the exhaust gas downstream of the second structure 4 has, averaged over time, fewer particles than the exhaust gas upstream of the first structure 3. In addition, the particles downstream of the second structure 4 have a larger mean diameter than upstream of the first structure 3, such that the emission in particular of fine dust in the exhaust gas of internal combustion engines can be reduced.

Figure 3:
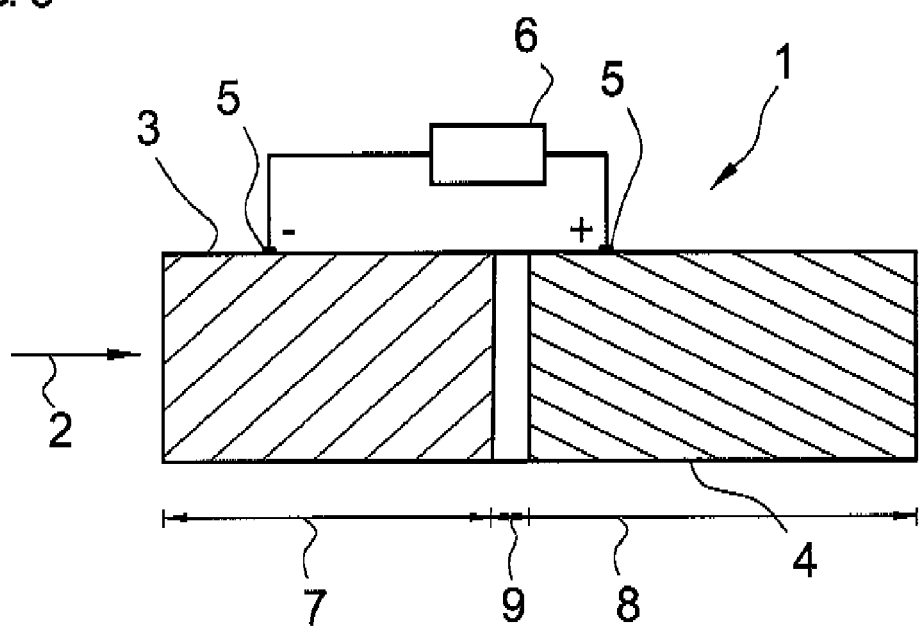
FIG. 3 is a view similar to FIG. 1 of another embodiment of the invention.

The first structure 3 has a first length 7 in the through-flow direction 2 and the second structure 4 has a second length 8. The structures 3, 4 are disposed at a spacing 9 from each either. The second length 8 is smaller than the first length 7 in FIG. 1, whereas the second length 8 is larger than the first length 7 in FIG. 3. As an alternative or in addition, the spacing 9 is preferably smaller than the first length 7 as in FIG. 1, preferably substantially smaller as in FIG. 3. The structures 3, 4 can be formed, for example, as customary honeycomb structures or honeycomb bodies. As an alternative or in addition, the structures 3, 4 can be at least partially formed, for example, as wire mesh structures, filter cartridges, metal foams or ceramic foams.

Figure 2:
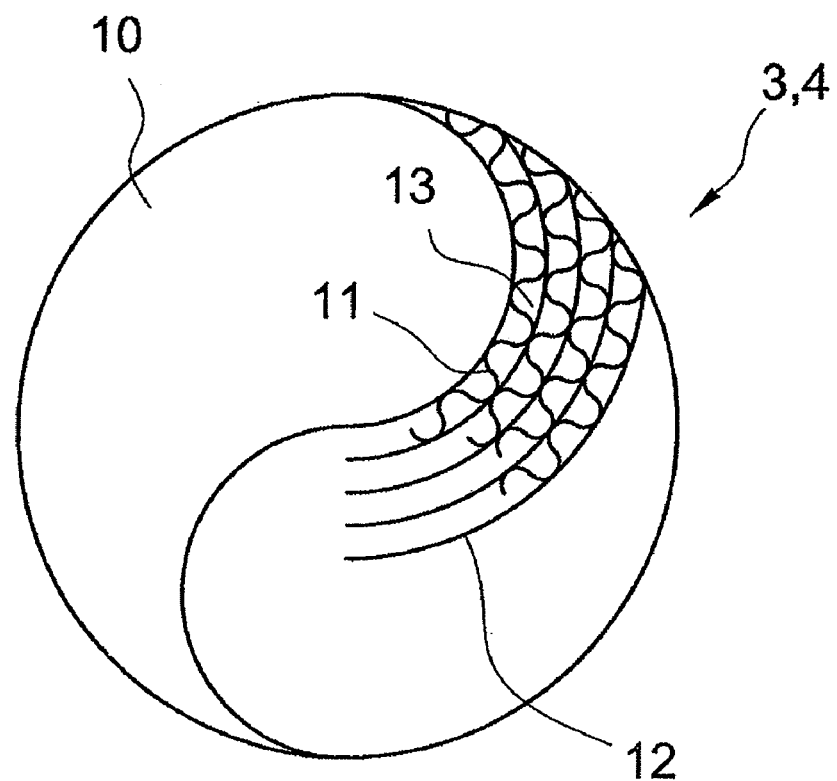
FIG. 2 is a cross-sectional view of a possible structure.

FIG. 2 diagrammatically illustrates an example of a structure 3, 4 in cross section. The structure 3, 4 is constructed as a honeycomb structure 10. In the present exemplary embodiment, the honeycomb structure 10 is formed from intertwined or twisted stacks of structured metallic layers 11 and substantially smooth metallic layers 12, forming channels 13. The exhaust gas can flow through the channels 13. The first structure 3 and the second structure 4 can preferably be formed with different numbers of channels per cross-sectional area from metallic layers 11, 12 of differing thickness. At least some of the layers 11, 12 can preferably be porous at least in subregions.

Due to the transfer of a charge to carbon-containing particles contained in the exhaust gas in the first structure 3, deposition and agglomeration of the carbon-containing particles take place on the second structure 4.

The invention claimed is:

1. A device for reducing the number of particles in the exhaust gas of an internal combustion engine, the device comprising:
    at least a first structure and a second structure;
    said structures configured for conducting an exhaust gas flow in a through-flow direction initially through said first structure and then through said second structure during operation;
    said structures configured for having an electric potential difference generated therebetween;
    each of said structures including a honeycomb structure having a plurality of cavities through which a fluid can flow;
    said first structure having a first length and said second structure having a second length in said through-flow direction with a ratio of said first length to said second length being less than one; and
    said structures defining a spacing in said through-flow direction between said first structure and said second structure with a ratio of said first length to said spacing being greater than approximately two.

2. The device according to claim 1, wherein at least one of said structures at least partially has a catalytically active coating.

3. The device according to claim 1, wherein said ratio of said first length to said spacing is greater than approximately four.

4. The device according to claim 1, wherein said ratio of said first length to said spacing is approximately seven or more.

5. A method for reducing the number of particles in the exhaust gas of an internal combustion engine, the method comprising the following steps:
    conducting an exhaust gas flow in a through-flow direction initially through a first structure having a first honeycomb structure and then through a second structure having a second honeycomb structure;
    establishing an electric potential difference between the first structure and the second structure;
    providing the first structure with a first length and the second structure with a second length in the through-flow direction with a ratio of the first length to the second length being less than one; and
    providing a spacing in the through-flow direction between the first structure and the second structure with a ratio of the first length to the spacing being greater than approximately two.

6. The method according to claim 5, which further comprises keeping the potential difference substantially constant over time.

7. The method according to claim 5, which further comprises varying the potential difference over time.

8. The method according to claim 5, wherein the potential difference is greater than 5 kilovolts.

9. The method according to claim 5, wherein the potential difference between the first structure and the second structure is positive.

* * * * *